(12) United States Patent
Jarvis et al.

(10) Patent No.: US 6,272,949 B1
(45) Date of Patent: Aug. 14, 2001

(54) AIR OPERATED FIFTH WHEEL UNCOUPLING APPARATUS

(75) Inventors: David J. Jarvis, Chicago, IL (US); Francis E. Madura, Whiting, IN (US); Thomas P. Gorman, Chicago, IL (US)

(73) Assignee: AMSTED Industries Incorporated, Chicago, IL (US)

( * ) Notice: Subject to any disclaimer, the term of this patent is extended or adjusted under 35 U.S.C. 154(b) by 0 days.

(21) Appl. No.: 09/219,976

(22) Filed: Dec. 23, 1998

(51) Int. Cl.[7] ............................. F16H 53/00; F16H 53/06
(52) U.S. Cl. ................... 74/569; 74/567; 74/110; 280/434; 280/437
(58) Field of Search ..................... 74/110, 99 R, 74/107, 567, 569; 280/434, 437

(56) References Cited

U.S. PATENT DOCUMENTS

| | | | |
|---|---|---|---|
| 2,395,223 | * 2/1946 | Ingres | 60/54.6 |
| 2,471,854 | 5/1949 | Bies et al. | 280/33.05 |
| 2,623,753 | 12/1952 | Madigan | 280/33.05 |
| 3,002,767 | 10/1961 | Gresko | 280/434 |
| 4,240,330 | * 12/1980 | Farr | 74/107 X |
| 4,745,820 | * 5/1988 | Benshoff et al. | 74/107 |
| 4,871,182 | * 10/1989 | Altherr et al. | 280/434 |
| 5,028,067 | 7/1991 | Madura | 280/433 |
| 5,176,396 | 1/1993 | Hawthorne et al. | 280/434 |
| 5,297,446 | * 3/1994 | Krillenberger | 74/569 |
| 5,326,422 | * 7/1994 | Kronseder | 74/567 X |
| 5,472,223 | 12/1995 | Hawthorne et al. | 280/437 |
| 5,516,138 | 5/1996 | Fontaine | 280/434 |
| 5,865,458 | * 2/1999 | Golembiewski et al. | 280/434 |
| 6,032,922 | * 3/2000 | Shew | 74/567 X |

* cited by examiner

*Primary Examiner*—Vinh T. Luong
(74) *Attorney, Agent, or Firm*—Edward J. Brosius (57) ABSTRACT

An accessory apparatus for uncoupling a king pin of a trailer from a locking device on a fifth wheel. The accessory apparatus includes a power device such as a pneumatic cylinder suspended from the bottom surface of the fifth wheel plate to form a fifth wheel assembly. A cam is mounted on the end of the power device's actuating member. The cam and actuating member are symmetric. A coil spring is held within the power device's housing, and is also symmetric with the longitudinal axes of the cam and actuating member. No external guides or springs are needed. The power device may be energized from a remote location to propel the cam to contact and propel a follower on an operating rod to unlock the fifth wheel jaw to release the king pin.

15 Claims, 6 Drawing Sheets

AIR OPERATED FIFTH WHEEL UNCOUPLING APPARATUS

BACKGROUND OF THE INVENTION

1. Field of the Invention

The present invention relates to fifth wheels for coupling tractors and trailers, including over the road tractors and yard tractors, and more particularly to an improved redundant powered apparatus for unlocking the connection to a trailer.

2. Description of the Prior Art

This invention is an improvement on the apparatuses shown in prior U.S. Pat. No. 4,871,182 (1989) to Altherr et al., U.S. Pat. No. 5,028,067 (1991) to Madura, U.S. Pat. No. 5,176,396 (1993) to Hawthorne et al., and U.S. Pat. No. 5,472,223 (1995) to Hawthorne et al., the complete disclosures of which are incorporated by reference herein in their entireties.

Fifth wheel devices include a plate which supports the forward bed plate of a trailer. A king pin is fixed to the trailer bed plate and extends into a center opening of the fifth wheel plate. Fifth wheels have included a pivotally mounted jaw to engage and hold the king pin against horizontal withdrawal. Normally, the jaw closes and is locked on the king pin as the tractor and trailer are brought together. However, there is also a mechanism provided to unlock the jaw to permit horizontal release of a king pin and allow separation of tractor and trailer when the trailer is stationary and the tractor is powered forward. That mechanism usually is operable manually by a driver and includes safeguards so as to avoid accidental release. While there have been earlier designs for automatically releasing fifth wheels, for example see U.S. Pat. No. 2,471,854 to Bies et al., experience with over the road hauling during the last several decades has developed an abundance of caution against automatic operation of fifth wheels and, largely for reasons of safety, the industry had disdained release mechanisms using accessory power. Thus, modern over the road fifth wheels, such as that shown in U.S. Pat. No. 4,871,182, have incorporated unlocking features that are solely operable from outside the tractor cab and have not been regarded as suitable for operation with accessory power. However, as trucks have tended to become larger in size and incorporate aerodynamic features it has become more difficult to reach the operation mechanism; this problem is exacerbated for persons of small stature. Furthermore, even for tall persons, manual operation has caused soiling and tearing of clothing and, for some, may have contributed to back strains and the like.

The inventions disclosed in U.S. Pat. Nos. 5,028,067, 5,176,396 and 5,472,223 have met the need for safe release mechanisms with accessory power. The accessory uncoupling apparatuses disclosed in those patents have been redundant systems, operable to manually override the manually operable unlocking mechanism. The accessory uncoupling apparatuses have also permitted remote activation of the jaw unlocking mechanism.

Two of those accessory uncoupling apparatuses, disclosed in U.S. Pat. Nos. 5,176,396 and 5,472,223, have utilized a reciprocable power device to move a cam against a fifth wheel operating rod. In both of these devices, the cam is connected to both a reciprocable power device and to a separate guide shaft. The guide shaft is slidable along a guide-way, and the guide way and reciprocable power device are connected to a mounting bracket. A cam return means, such as a spring, has also been included. The mounting bracket, cam, reciprocable power device, cam return means, guide shaft and guide cam are fabricated into an assembly, and the fabricated assembly is attached to a web on the underside of a fifth wheel plate to retrofit an existing fifth wheel assembly with the powered unlocking system. Although such a system has been successful, it has manufacturing disadvantages in the number of parts and the time and expense involved in fabricating the assembly.

SUMMARY OF THE INVENTION

The present invention provides a fifth wheel assembly with an accessory uncoupling apparatus that permits remote activation of the jaw unlocking mechanism. The accessory uncoupling apparatus is redundant to and may be operated to override the manually operable unlocking mechanism. The accessory uncoupling apparatus may be retrofitted on a fully manual fifth wheel to enable powered unlocking of the fifth wheel jaw mechanism redundant to the normal manual unlocking mechanism thereon. The accessory uncoupling apparatus of the present invention contains fewer parts than prior cam-operated powered systems, with simpler fabrication, to reduce production costs. With fewer parts, the weight of the assembled fifth wheel and accessory uncoupling apparatus is reduced for increased efficiency.

DETAILED DESCRIPTION

Figure 1:
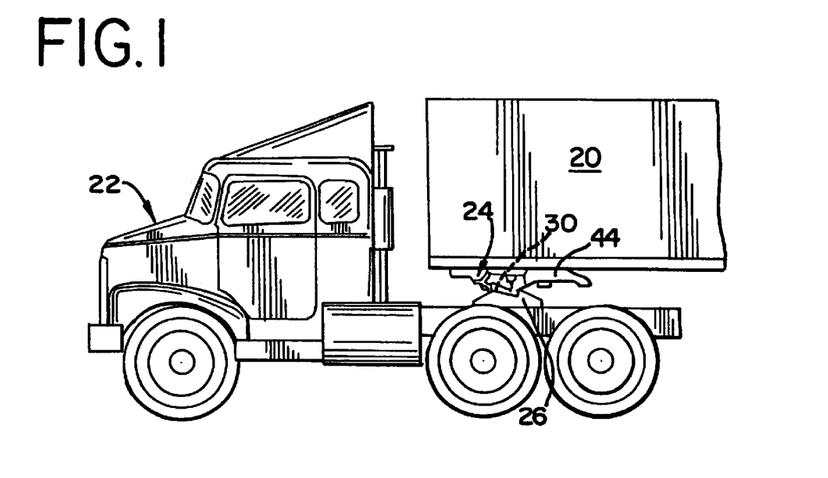
FIG. 1 is a side elevation view of a tractor coupled with a trailer through a fifth wheel.

A trailer 20 and tractor 22 arrangement is shown in FIG. 1, which trailer 20 and tractor 22 are coupled at fifth wheel 24. The illustrated tractor and trailer comprise an over the road vehicle, but the present invention may also be utilized with a yard tractor for yard-jockeying. As used herein, the word "tractor" includes both over the road tractors and yard tractors.

The fifth wheel 24 may be generally in accordance with U.S. Pat. No. 4,871,182; the fifth wheel illustrated in FIGS. 2–5 has the fifth wheel bearing plate 25 of U.S. patent application Ser. No. 09/167,649, filed on Oct. 6, 1998 by Golumbiewski et al. as a continuation-in-part of application Ser. No. 08/771,106, the disclosure of which is incorporated by reference herein in its entirety, and has been modified to include the accessory uncoupling apparatus 200 of the present invention and a guide path 140 on the underside of the fifth wheel plate. It should be understood that the accessory uncoupling apparatus of the present invention may be used with other fifth wheel plate structures, such as the structures shown in U.S. Pat. Nos. 5,472,223 and 4,871, 182.

Figure 2:
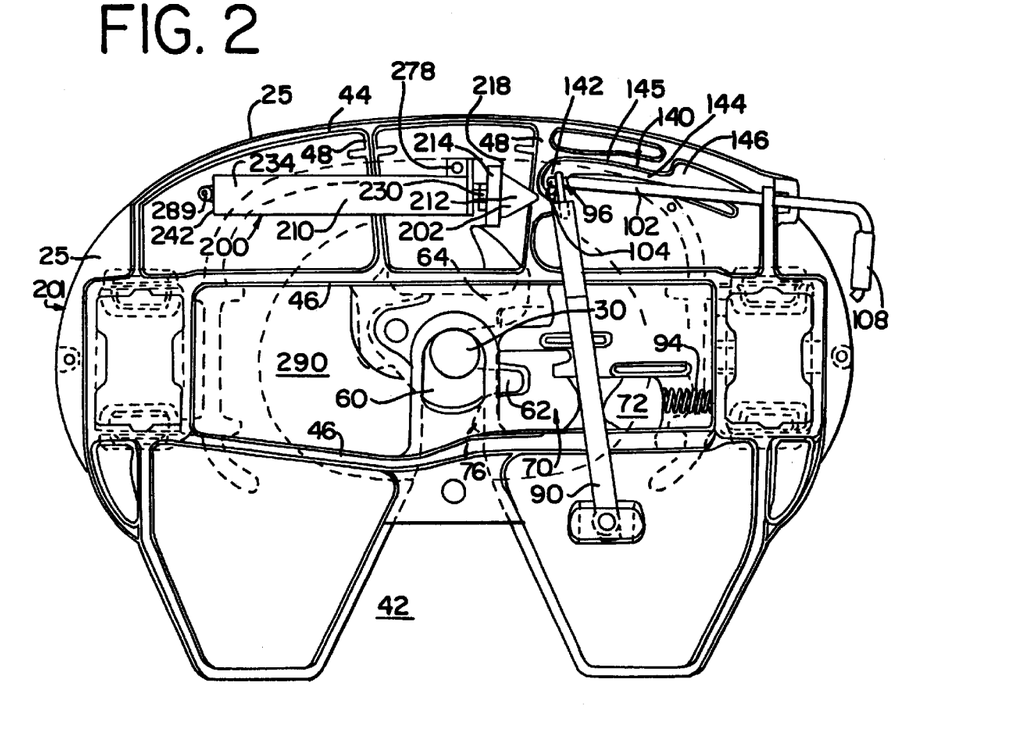
FIG. 2 is a bottom plan view of a fifth wheel assembly incorporating the accessory uncoupling apparatus of the present invention, with a reciprocable cam retracted and a locking jaw in a first closed and locked position.

As shown in FIGS. 2–5, the fifth wheel plate 25 contains an open "V" slot 42 to receive (and release) the trailer kin pin 30 and the underside of the fifth wheel plate is reinforced with a skirt 44 and webs 46, 48. A locking jaw 60 is pivotally mounted to the underside of the plate and positioned to swing across the apex of the "V" slot 42. The jaw 60 is bifurcated into a detent portion 62 and a foot portion 64 with an opening therebetween. In FIG. 2, the jaw 60 is shown in a closed and locked position capturing a reduced neck portion of king pin 30 and preventing extraction of the pin 30 from the fifth wheel 24. This closed and locked position is automatically assumed when a trailer is moved relatively forwardly onto the fifth wheel 24 so as to advance the king pin 30 through the slot 42 and against the inner portion of jaw foot 64.

A locking mechanism generally 70 is slidingly engagable with the jaw detent 62 when the jaw is in the closed position, as illustrated in FIG. 2, and thereby locks the jaw 60 closed. Locking mechanism 70 includes a bolt 72 and head 76 that are held under the fifth wheel plate 25 by a cover guard (not shown) and intersected by a locking lever 90 that is pivotally secured at one end to the underside of the fifth wheel plate 25. A compression spring 94 biases the bolt 72 to move inwardly toward the jaw 60. Thus when a king pin 30 is moved into the jaw 60 spring 94 will drive the bolt 72 and head 76 inwardly to capture detent 62 and also move the locking lever 90 inwardly (counterclockwise as viewed in FIGS. 2–5).

It is also shown that the free end of locking lever 90 terminates in an eyelet 96 that cooperatively receives a crank of an operating rod generally 102 that extends outwardly through a port in skirt 44 to a handle 108. When the compression spring 94 of the locking mechanism 70 drives bolt 72 and locking lever 90 counterclockwise, the operating rod 102 will be carried in the same direction. The inner end of the operating rod 102 terminates as an operating leg 104 that cooperates with a guide path 140 on the underside of the fifth wheel plate 25. The guide path 140 is preferably in the form of a track or groove having a generally "Z" shaped configuration of three legs 142, 144 and 146 which translate successively, to locked, transition, lockset and unlocked positions of the locking mechanism generally 70.

Normally, as explained in U.S. Pat. No. 4,871,182, the locking mechanism 70 is moved from locked to unlocked condition through the aforesaid positions manually by a driver grasping the handle 108 and rotating and pulling the rod 102 so that the operating leg 104 moves along the legs 142, 144, 146 of the guide path 140. In the present invention, a portion of the operating rod 102, such as the operating leg 104, comprises a cam follower, and a reciprocable cam generally 202 is located to push and turn the follower 104 so as to trace the same path along legs 142, 144 and lockset portion 146 of the groove 140.

As illustrated in FIGS. 2–5, the present invention provides an accessory uncoupling apparatus 200 that may be mounted to the fifth wheel plate 25 to form a fifth wheel assembly 201. The accessory uncoupling apparatus 200 includes a cam 202 and a power device 210, along with a mounting bracket 278 and mounting spacer 289 in the illustrated embodiment.

Preferably the power device 210 is a pneumatic cylinder since virtually all over the road tractors have air compressors. However, it is also possible to employ equivalent power sources such as a hydraulic cylinder or electric solenoid and the like.

Figure 6:
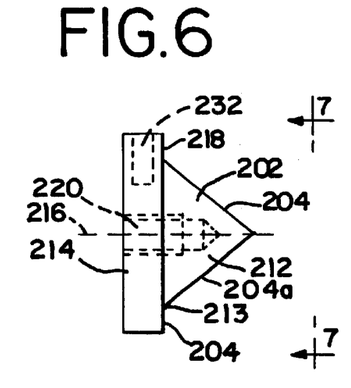
FIG. 6 is a detailed elevation view of the cam of the accessory uncoupling apparatus of FIGS. 2–5.
Figure 7:
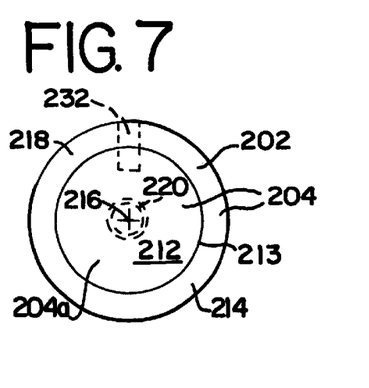
FIG. 7 is an end view of the cam of FIG. 6, taken along line 7—7 of FIG. 6.

As shown in FIGS. 6–7, the cam 202 of the accessory uncoupling apparatus 200 of the present invention has guide surface 204 for engaging the follower 104. The cam of the present invention is directly connected to the power device 210 so that upon activation of the power device 210, the cam 202 is moved from a retracted position to an extended position. As the cam 202 is moved from the retracted position, the guide surface 204 contacts the follower 104 and propels the follower along the guide path 140 from the locked position shown in FIG. 2, and along legs 142, 144, 146, reaching the lockset position shown in FIG. 5 when the cam 202 is fully extended.

The illustrated cam 202 is shaped for moving the follower 104 through a desired path of travel to move the locking lever 90 from the locked to the lockset position as shown in FIGS. 2–5. In the illustrated embodiment, the fifth wheel is of the general type disclosed in U.S. Pat. No. 4,871,182, requiring rotation of the operating rod 102 to rotate a position indicating device and to move the operating rod longitudinally along a guide path, and the illustrated cam 202 is shaped to both rotate the operating rod 102 and propel the operating rod through a guide path 140 to pivot the locking lever 90. It should be understood that the accessory uncoupling apparatus 200 of the present invention may be used with other types of fifth wheels as well, with adjustments to the cam 202. The cam may also be shaped to contact the locking lever 90 instead of the operating rod, in which case a portion of the locking lever 90 would comprise the cam follower. As discussed below, the shape of the cam guide surface 204 may be designed for a particular application, or the first illustrated cam may be used for all applications.

As shown in FIGS. 2–5 and 6, the first illustrated cam 202 has a conical portion 212 and an integral cylindrical collar portion 214. The cylindrical collar portion 214 is nearest the power device 210, and the conical portion 212 expands toward the power device 210. As shown in FIGS. 6–7, the conical portion 212 has a maximum outer diameter at its base 213 where it joins the cylindrical collar portion 214. In the illustrated embodiment, the diameter of the base 213 of the conical portion 212 is 1.875 inches, and the height of the conical portion is 1.12 inches, so that the outer conical guide surface 204 defines an angle of about 40° with the central longitudinal axis 216 of the cam 202.

The outer diameter of the cylindrical collar portion 214 is greater than the outer diameter of the conical base 213. In the illustrated embodiment, the outer diameter of the cylindrical collar portion 214 is about 2.5 inches, and its height is about 0.5 inches. The top surface of the cylindrical collar portion 214 at the juncture with the base 213 of the conical portion 212 defines an annular shelf or shoulder 218 with a width of 0.312 inches in the illustrated embodiment.

The cam 202 may be made of any suitable material. In the illustrated embodiment, the cam is made of type 1045 steel.

As shown in FIGS. 6–7, the cam 202 has a threaded bore 220 extending from the cylindrical collar portion 214 into the conical portion 212. Through the threaded bore 220, the cam 202 is mounted on the end of an actuating member 222 or cam shaft of the power device 210.

Figures 12, 13, 14, 15, 16, 17, 18:
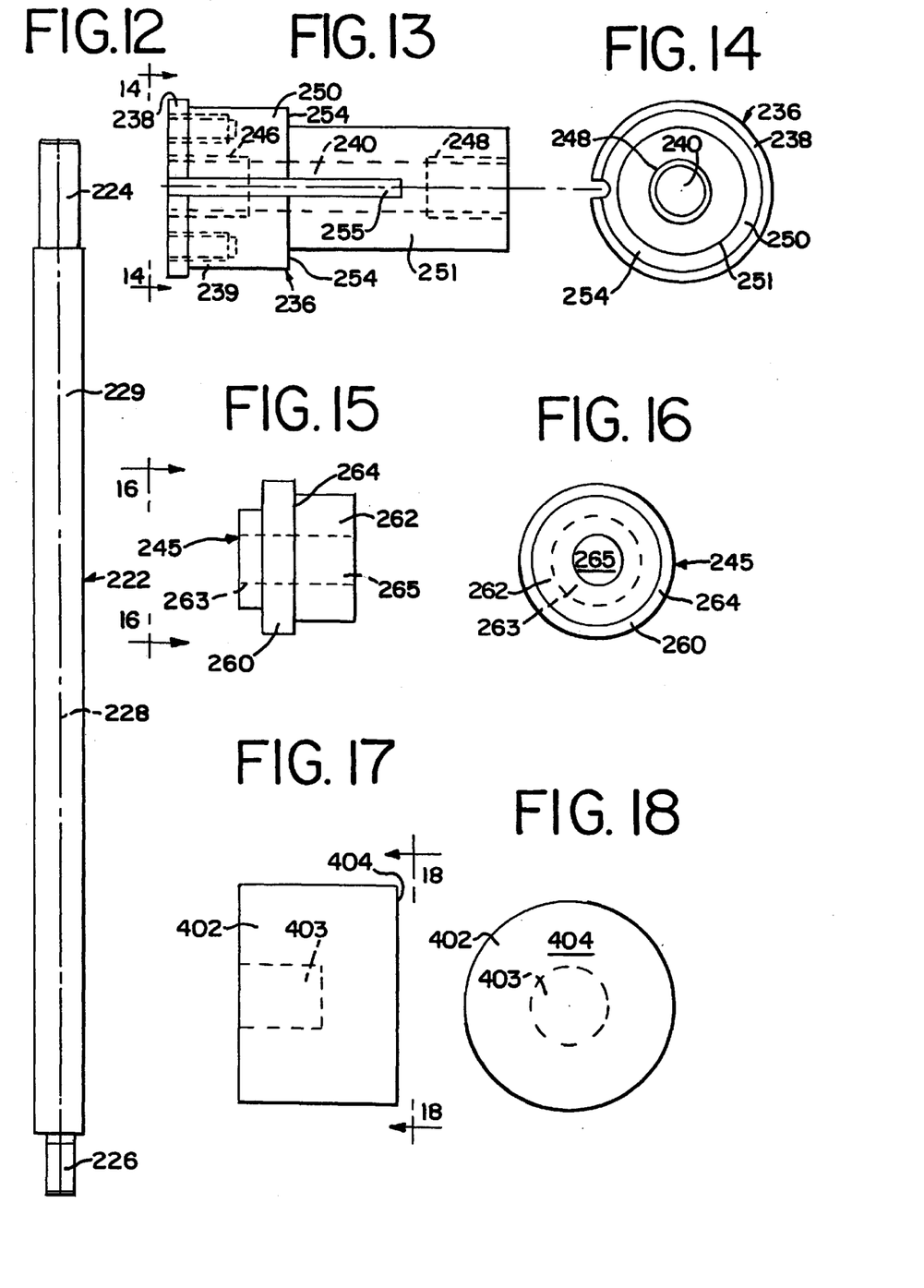
FIG. 12 is a detailed view of the actuating member of the accessory power device of FIG. 8.
FIG. 13 is a detailed elevation view of the top end cap of the accessory power device of FIG. 8.
FIG. 14 is an end view of the end cap of FIG. 13, taken along line 14—14 of FIG. 13.
FIG. 15 is a detailed elevation view of the spring retainer of the accessory power device of FIG. 8.
FIG. 16 is an end view of the spring retainer of FIG. 15, taken along line 16—16 of FIG. 15.
FIG. 17 is an elevation view of an alternate cam of the accessory uncoupling apparatus for use with a fifth wheel having an operating rod that is pulled and raised.
FIG. 18 is an end view of the alternate cam of FIG. 17, taken along line 18—18 of FIG. 17.

The illustrated actuating member 222 or cam shaft comprises an elongate solid rod having an outer diameter of ⅝ inch for the majority of its 15.25 inch length, with reduced diameter threaded front and back ends 224, 226. It has a central longitudinal axis 228 that is co-linear with the central longitudinal axis 216 of the cam 202 when connected.

The actuating member 222 is connected to the cam 202 by inserting the threaded front end 224 of the actuating member 222 into the threaded bore 220 of the cam and turning the actuating member 222 about its central longitudinal axis 228. A lock nut 230 may be used to fix the cam 202 and actuating member 222 together, and the cam may include a radial bore 232 (see FIGS. 6–7) to receive a tool to hold the cam steady as the actuating member 222 or lock nut 230 are turned. Other means for fixing the cam and actuating member together so that they turn as one can be used; for example, a set screw could be inserted through the cam 202 to contact the actuating member 222. In any event, in the illustrated embodiment, the cam and actuating member are connected in a non-pivoting connection, with no relative rotation between them. However, the cam 202 and actuating member 222 may rotate as a unit; but since they are symmetrical about their longitudinal axes 216, 228, even if there is rotation the follower 104 always bears against the same profile for the cam guide surface 204.

The actuating member 222 may be made of any suitable material. The illustrated actuating member 222 is made of type 304L stainless steel. Other materials and sizes of materials may be used for the actuating member, and it should be understood that a plurality of actuating members could be connected to the cam through other connection methods. Whether one or several actuating members are used, in the illustrated embodiment of the present invention, the actuating member 222 or members provide the load path for the power device to move the cam, and the only load path for the load on the cam from the follower 104 is through the actuating member 222 or members. Loads perpendicular to the axes 216, 228 are typically on the order of about 10 pounds, but may extend up to 40 pounds; the actuating member or members should be made of a material and sized to withstand these forces without substantial deformation.

Figure 8:
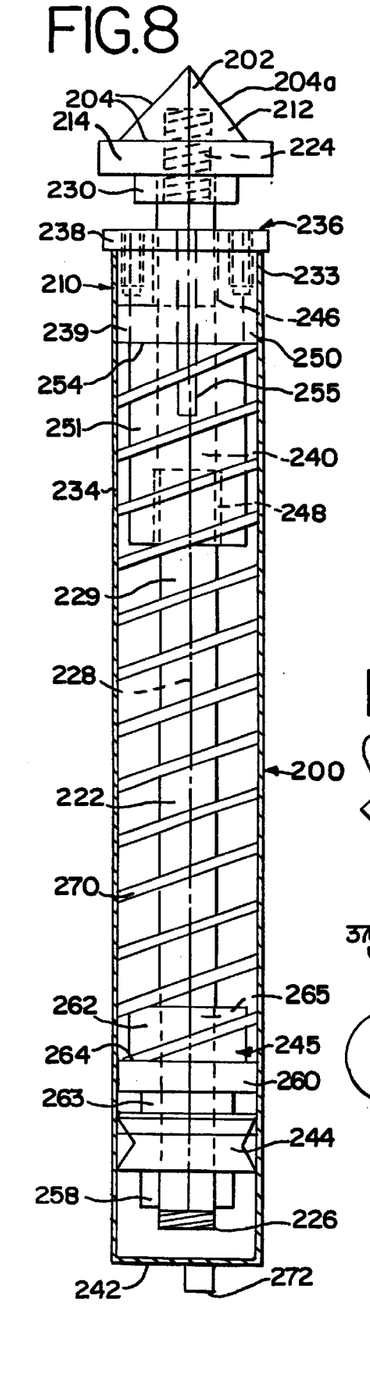
FIG. 8 is a detailed view of a portion of the air-operated accessory uncoupling apparatus shown in FIGS. 2–5, comprising an accessory power device with a reciprocable cam, with the tubular housing shown in cross-section to illustrate the interior elements of the power device.

As shown in FIGS. 2–5 and 8, in the first illustrated embodiment, the actuating member 222 has an elongate outer surface 229 and is capable of reciprocal movement in directions parallel to the elongate outer surface 229 to extend and retract the cam 202. As shown in FIG. 8, the outer surface of the conical portion 212 of the cam 202 defines a non-perpendicular cam guide surface 204a that defines an angle other than 90° with the elongate outer surface 229 of the actuating member. As shown in FIG. 8, at least a part of the non-perpendicular guide surface 204a is aligned with at least part of the elongate outer surface 229 of the actuating member 222.

As shown in FIG. 8, in the first illustrated embodiment, at least a part of the actuating member 222, including its back end 226, are received within an elongate cylindrical housing or tube 234. The illustrated housing 234 has an outer diameter of about 2⅛ inches and an inner diameter of about 2¹⁄₁₆ inches. The housing may be made of any suitable material, such as 304 stainless steel. At its front end 233, the housing 234 has a front end cap 236 with an exterior portion 238, an interior portion 239, and a central bore 240 extending through both the interior and exterior portions. The interior part 239 of the body of the end cap 236 is received within the interior of the housing 234. At its opposite back end 242, the housing 234 is closed and has a port 272 for connection to a source of pressurized fluid such as air. Within the housing, the illustrated power device 210 has a piston head 244 that is mounted on the back end 226 of the actuating member 222. The piston may be a standard structure.

In the illustrated embodiment, the front annular end cap 236 has a length of about 4.25 inches, and its central bore 240 extends the entire length of the end cap. The actuating member 222 extends through the central bore 240. Within the central bore 240, the end cap has a pair of spaced annular bushings 246, 248, each having a length of about one inch, an outer diameter of about ¾ inch, and an inner diameter of about ⅝ inch. The inner diameters of the bushings 246, 248 and outer surface 229 of the actuating member 222 are machined to close tolerances so that the actuating member may be reciprocated through the bushings and also guided by the bushings to maintain a linear path of travel. The bushings serve to guide the movement of the actuating member, and no external guide means are necessary; together, the actuating member and bushings guide movement of the cam; no external guide shaft or guide way are needed, although the invention is not limited to the absence of external guides unless the claims are expressly limited.

The exterior and interior portions 238, 239 of the end cap 236 are integral, and the interior portion 239 comprises integral front and back portions 250, 251. The interior front portion 250 has a diameter sized to fit the inner diameter of the housing 234; in the illustrated embodiment, this diameter is 2.017 inches. Adjacent to this front portion 250, the interior back portion 251 has a reduced diameter that has an outer surface spaced from the inner walls of the housing 234 so that an annular spring seat 254 is defined. The illustrated front end cap 236 is made of aluminum. The end cap 236 has a port 255 that extends back beyond the spring seat 254 so that the spring does not block the port.

Within the power device 210, the piston head 244 and actuating member 222 may be connected through a threaded connection, and a lock nut 258 may also be used to connect them, as shown in FIG. 8. In the illustrated embodiment, to reduce wear on the piston head 244, an annular spring retainer 245 is provided. The illustrated spring retainer 245 has a central portion 260 with a diameter of 1.940 inches, to fit and slide within the inner diameter of the housing 234. An integral front portion 262 has a reduced diameter to define an annular spring seat 264 on the spring retainer 245. An integral back portion 263 rests on the piston head 244. The spring retainer 245 has a central bore 265 through which the actuator member 222 is received.

The illustrated power device 210 also includes a retracting mechanism. In the illustrated embodiment, the retracting mechanism comprises a coil spring 270 seated on the spaced spring seats 254, 264 of the front end cap 236 and the spring retainer 245. The illustrated coil spring 270 comprises a type 302, ASTM A313 stainless steel spring with an outer diameter of 1.94 inches. The illustrated spring has an initial free length of 13¾ inches, reduced to about 12 inches after undergoing five cycles. The illustrated spring also has a solid spring height of 2⅜ inches and a wire diameter of 0.148 inches. In the illustrated power device 210, the spring 270 is totally housed within the housing 234. It should be understood that this spring is identified for purposes of illustration only; the invention is not limited to such a spring or to such a retracting mechanism unless expressly set forth in the claims. In the illustrated embodiment, the spring 270 and actuating member 222 are substantially concentric in the housing 234. Thus, the cam 202 and power device 210 are substantially symmetric about the longitudinal axes 216, 228 of the cam 202 and actuating member 222.

The back end of the illustrated housing 234 includes a supply port 272. The supply port 272 is connected to a hose or conduit and delivers pressurized fluid, such as air, into a gap in the housing between the piston head 244 and the back end of the housing. When fluid is introduced into the housing 234 through the supply port 272, the pressure propels the combined piston head 244 and actuating member 222 toward the front end cap 236, along with the spring retainer 245, thereby compressing the spring 270 and extending the actuating member and cam further out away from the housing 234. As the pressure is relieved, the spring 270 pushes the spring retainer 245, piston head 244 and actuating member 222 combination back toward the back end of the housing 234 to retract the actuating member and cam back toward the housing. Thus, the load paths for the extending and retracting forces are substantially the same.

It should be understood that other retracting mechanisms could be used. For example, an annular elastomer could be provided in the housing. Or, a coil spring could be attached to the housing and to either the piston head or actuating member to pull the actuating member back into the housing. The spring could be located outside of the housing, but it is preferred to keep the spring within the housing 234 for longevity and for ease of manufacture. The spring could act directly against the piston head 244, although use of the spring retainer 245 should decrease wear on the piston head 244.

Figure 9:
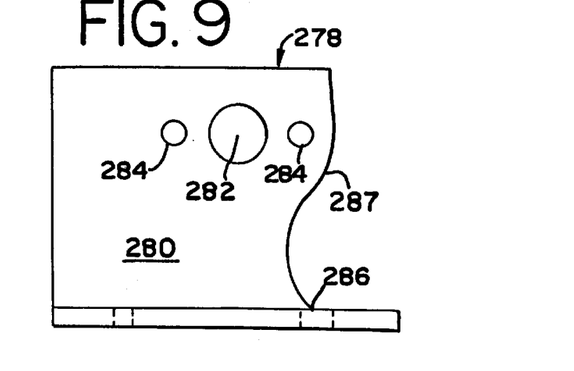
FIG. 9 is an elevation of a mounting bracket for mounting the accessory power device on the fifth wheel.

To mount the accessory uncoupling apparatus 200 on the fifth wheel plate 25, a mounting bracket 278 of the type shown in FIG. 9 may be used. The illustrated mounting bracket 278 is L-shaped, and has one face 280 with a bore 282 through which the actuating member 222 may extend, along with two other bores 284 to receive screws for mounting to the end cap 236 to thereby mount the power device 210 to the mounting bracket 278. The perpendicular face 286 of the mounting bracket 278 has bores to receive screws or bolts for mounting the bracket to the bottom surface 290 of the fifth wheel plate 25, the bottom surface 290 being perpendicular to the webs 46, 48 and skirt 44. As shown in FIG. 9, one edge 287 of the bracket 278 may be contoured to prevent interference with movement of the jaw 60. To steady the back end 242 of the housing 234, a mounting spacer 289, such as that shown in FIG. 10, may be fixed to the housing 234 such as by welding and may be similarly fixed to the bottom surface 290 of the fifth wheel plate 25.

The fifth wheel plate 25 may have threaded holes for hanging the mounting bracket 278 and spacer 289 from the bottom surface 290 of the plate 25 with screws, and preferably with a thread locking material to preclude looseness due to vibrations. Alternatively, a recess could be formed in the top surface (not shown) of the fifth wheel plate 25, with a bore through the plate to receive a bolt shank; a nut could be tightened on the underside of the fifth wheel plate, and the edges of the recess could serve to keep the bolt head from rotating as the nut is tightened; the nuts may be lock nuts, or locking washers could be used to preclude loosening due to vibration.

Figures 10, 11:
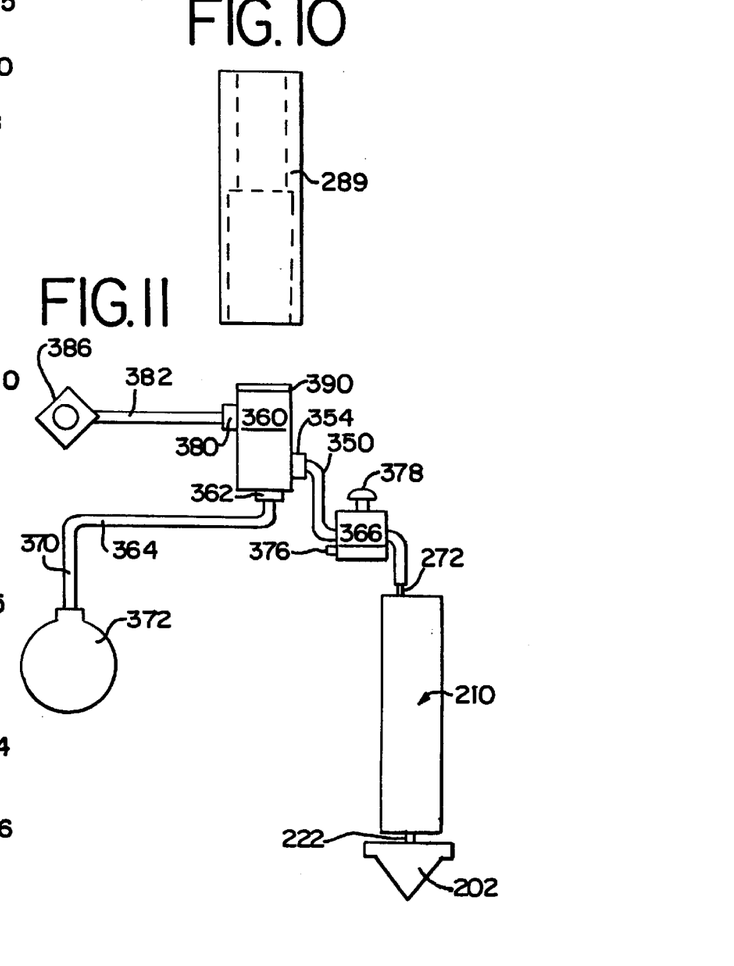
FIG. 10 is an elevation of a mounting spacer for supporting the back end of the accessory power device on the fifth wheel plate.
FIG. 11 is a schematic illustration of an energizing and control system for the present invention.

The accessory uncoupling apparatus 200 may otherwise be connected to the truck as in the prior art. A schematic illustrating an appropriate connection is illustrated in FIG. 11. As there shown, the power device 210 comprises an air cylinder. When the power device 210 is pneumatic, it is preferred that it be a single-acting so as to extend the actuating member 222 upon introduction of compressed air through a fluid conduit 350 connected to a delivery port 354 of an inversion valve 360. A supply port 362 on the inversion valve 360 is connected through a conduit 364 to a pressurized air supply line 370 of the tractor air compressor 372. A spring loaded control valve 366 may conveniently be located in the tractor cab and be biased to a normally closed position to inhibit the unwanted passage of air from the pressurized line 350. Thus, valve 366 must be manually held open by handle or button 378 to open the connection to high pressure line 370 and to introduce pressurized air into the fitting connected to the air cylinder supply port 272. Release of the handle 378 closes the valve 366 and the connection to inversion valve 360, and simultaneously connects the fitting and air cylinder supply port 272 to the exhaust port 376 on the valve 366.

Control port 380 on inversion valve 360 is connected by conduit 382 to tractor parking brake control valve 386. Inversion valve 360 is a pilot-operated two-way valve having an internal spring loaded piston (not shown) that operates internally to control air flow between deliver port 354 and supply port 362 and to alternately connect delivery port 354 either to supply port 362 or to exhaust opening 390 at one end of the valve body. The internal piston of valve 360 is driven to close the connection between the supply port 362 and delivery port 354, and to connect the latter to exhaust conduit 382 to control port 380. As an example, a suitable commercially available inversion valve for the control system described is model TR-3 of the Bendix Heavy Vehicle Systems Group of Allied-Signal, Inc. of Morristown, N.J. As an example, a suitable spring-loaded control valve 366 is a Bachman RA-529 or equivalent available from Bachman Valve Corp. of Bristol, Tenn.

While the tractor parking brake is not applied, that is, during all times that the tractor is capable of movement, pressurized air will be continuously delivered to control port 380, as the usual brake system for tractors is a fail-safe design utilizing pressurized air to maintain the brakes in a disengaged mode. Thus, inversion valve 360 will connect fluid conduit 350 and power device 210 to exhaust opening 390 of inversion valve 360 and will block the supply of pressurized air to power device 210 until the tractor parking brake control valve 386 is engaged. Engagement of valve 386 severs the flow of pressurized air to control port 380, and inversion valve 360 connects conduits 364 and 350, thereby supplying pressurized air to the power device 210 as long as the spring loaded valve 366 is held open by manual actuation of button 378. Thus, reciprocable actuating member 222 and cam 202 are extendable to unlock jaw 60, as in FIG. 5, only when the tractor parking brake is engaged. At release of button 378 and closure of valve 366, spring 270 will return cam 202, actuating member 222 and piston head 244 to the retracted or withdrawn position shown in FIG. 2 and pressurized air within the housing 234 of the power device 210 will be expelled through exhaust port 376 on the control valve 366. Air will be drawn into the housing 234 on the non-pressurized side of the piston 244 through port 255 on end cap 236. It should be understood that the above-described circuit is provided by way of example only; other control circuits and arrangements may also be used and are functional to actuate the accessory uncoupling apparatus 200.

Figure 3:
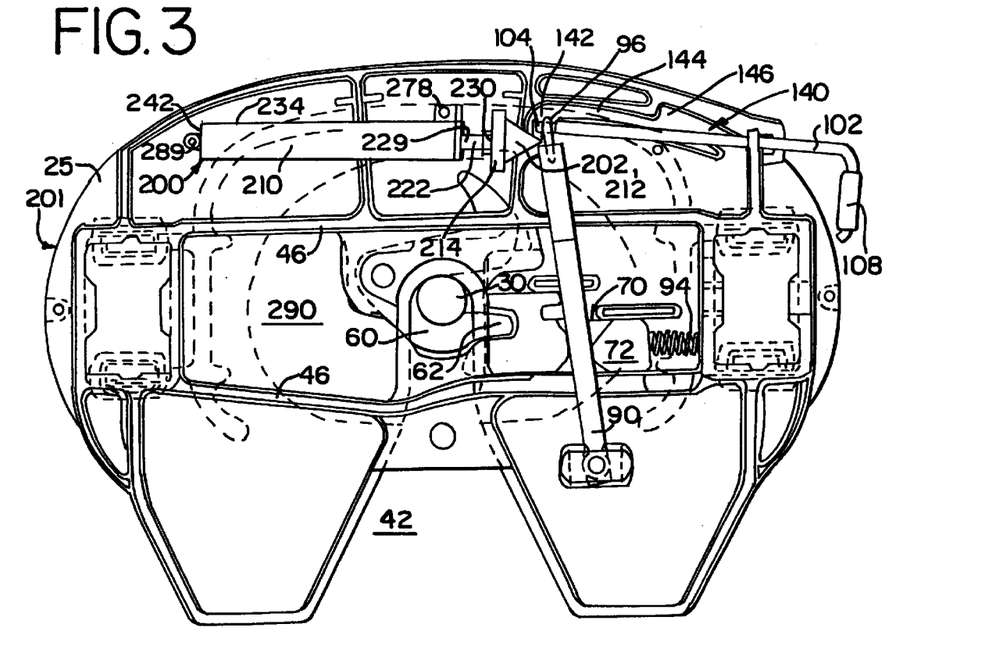
FIG. 3 is a bottom plan view of the fifth wheel assembly of FIG. 2, with the reciprocable cam partially extended and contacting the operating rod.
Figure 4:
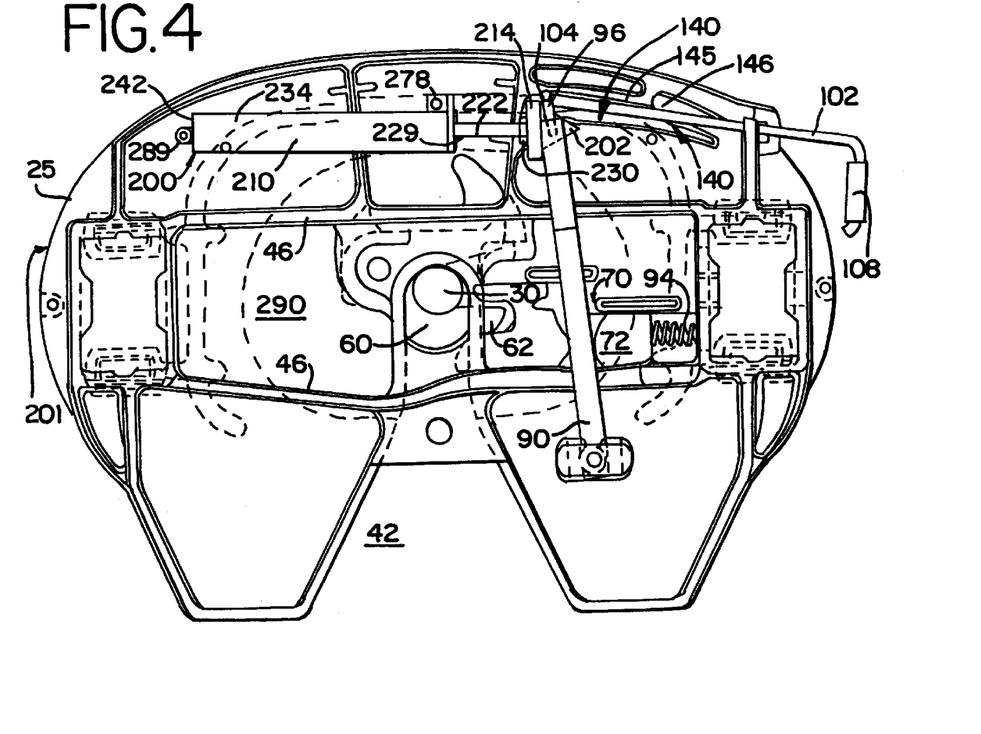
FIG. 4 is a bottom plan view of the fifth wheel assembly of FIGS. 2–3 with the reciprocable cam further extended to rotate the operating rod.
Figure 5:
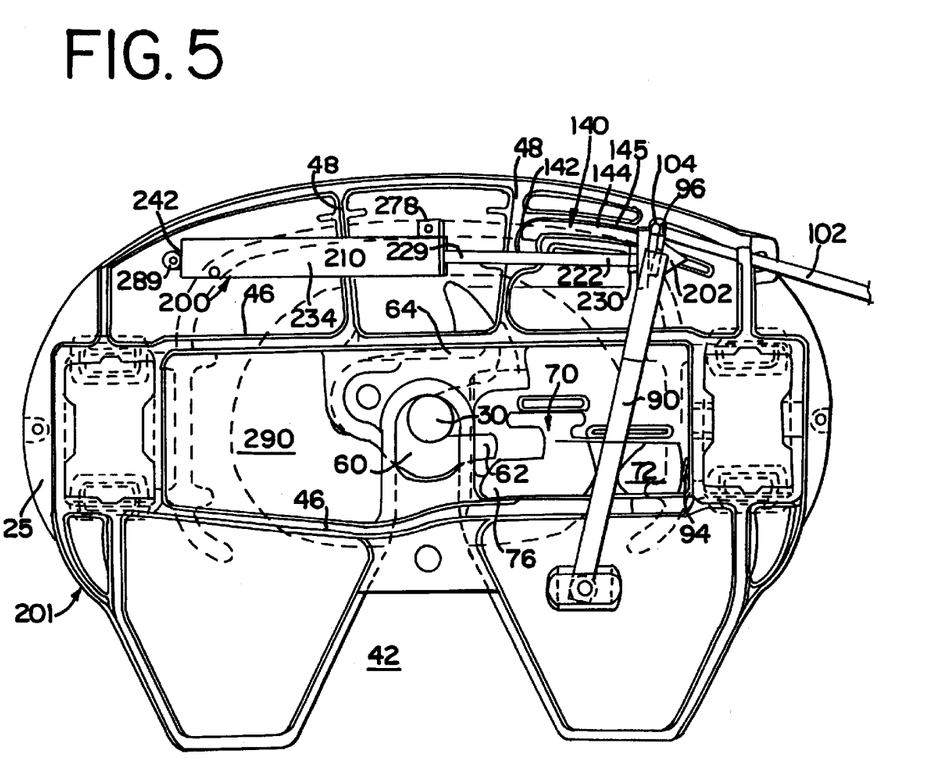
FIG. 5 is a bottom plan view of the fifth wheel assembly of FIGS. 2–4 with the reciprocable cam further extended to push the operating rod to the lockset position, with the jaw unlocked but closed.

When the pressurized air is introduced through port 272 into the interior of the housing 234 of the power device 210, the pressurized air forces the piston head 244 toward the front of the housing 234, forcing the actuating member 222 and cam 202 farther out from the front of the housing 234, from the position shown in FIG. 2 to that shown in FIG. 3, where the cam 202 first contacts the follower 104. As the pressurized air pushes the piston head 244 farther toward the front end of the housing 234, the actuating member 222 and cam 202 are pushed farther out of the housing. The follower 104 travels along the conical part of the cam guide surface 204, and the operating rod 102 is rotated or turned to kick the end of the rod out of the first leg 142 of the guide path 140, as shown in FIG. 4. As the pressurized air pushes the piston head 244 farther toward the front end of the housing 234, the actuating member 222 and cam 202 are pushed still farther out of the housing, and the follower 104 travels toward the annular shoulder 218 of the cam, and the follower is pushed by the cam along the front wall 145 of the leg 144 of the guide path 140 until the follower reaches the lockset position shown in FIG. 5, where the cam 202 kicks the end of the operating rod 102 into the lockset position in the last leg 146 of the guide path. Movement of the follower 104 moves the operating rod outward and pivots the locking lever 90 in a clockwise direction in FIGS. 2–5. As the locking lever 90 is pivoted, the bolt 76 of the lock 70 is retracted until the detent portion 62 of the jaw 60 is substantially disengaged and able to rotate. When the operator releases the button 278 to close valve 366, air pressure in the housing 234 is released and the spring 270 acts to push against the spring retainer 245 to push the piston head 244 toward the back end 242 of the housing 234, thereby withdrawing part of the actuating member 222 into the housing and returning the actuating member and cam to the position shown in FIG. 2. In the lockset position, the jaw 60 remains closed and has not yet rotated, but the king pin 30 can be removed by pulling the truck forward so that the king pin 30 pushes against the jaw 60 to rotate the jaw into the unlocked or open position, such as shown in FIG. 7 of U.S. Pat. No. 4,871,182.

The accessory uncoupling apparatus 200 of the present invention may also be used with fifth wheels having operating rods that do not rotate, but that are pulled outward and then raised to place the operating rod 102 in the lockset position such as in the fifth wheels shown in U.S. Pat. No. 5,472,223. For such uses, the accessory uncoupling apparatus may use an alternate cam 402, shown in FIGS. 17–18, instead of the cam shown in FIGS. 6–7. The illustrated alternate cam 402 is disc-shaped, or cylindrical, with a diameter of about 1¾ inches and a height of about 1¼ inches. This cam 402 may also be made of type 1045 steel, and may have a threaded central bore 403 for mounting on the top end of the actuating member 222 of the power device 210, replacing the cam 202 of the first embodiment in FIG. 8. In the second embodiment of FIGS. 17–18, the front flat face 404 serves as the cam guide surface; as in the first embodiment, at least a part of this face 404 is aligned with the elongate exterior surface 229 of the actuating member 222.

When mounting the accessory uncoupling apparatus to a fifth wheel that is of the straight pull type, a mounting bracket similar to that shown in FIG. 9 may be used, although the dimensions may vary. The distance between the fifth wheel plate and the power device may be greater, for example, by about one-half inch. The position of the accessory uncoupling device and the shape of the cam should cooperate to raise the operating rod to the desired lockset position after the rod has been pushed out.

It should be understood that other shapes of cam may be used with the accessory uncoupling apparatus of the present invention, and that the invention is not limited to a particular shape of cam unless expressly called for in the claims.

Figure 19:
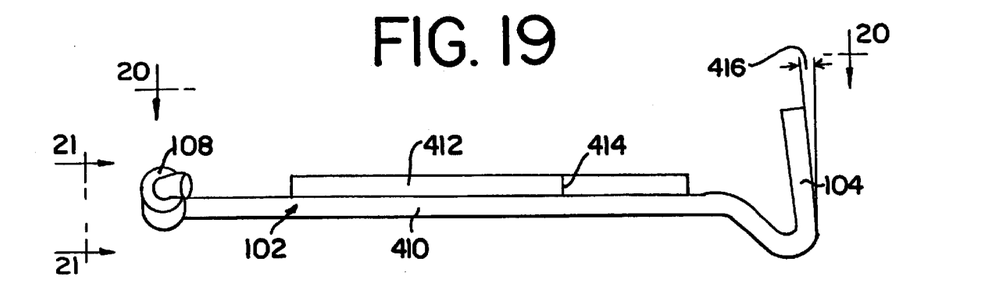
FIG. 19 is an enlarged side view of a rotary type operating rod for use with a fifth wheel of the type shown in FIGS. 2–5.
Figures 20, 21:
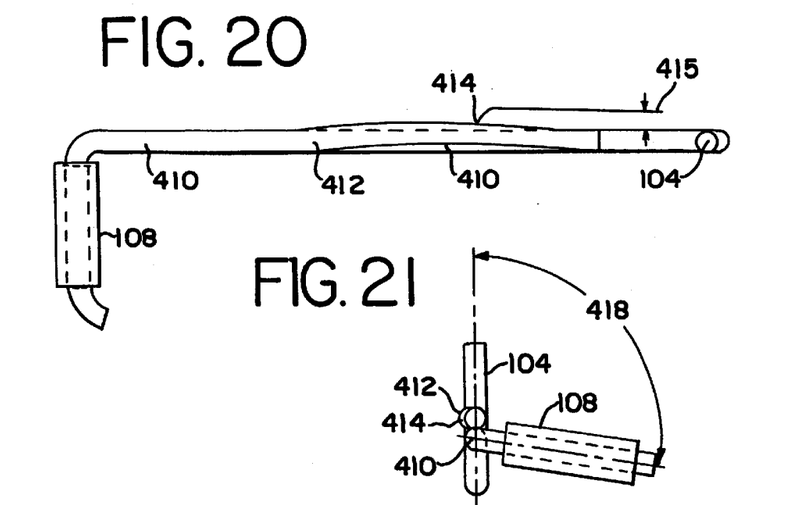
FIG. 20 is a top plan view of the operating rod of FIG. 19.
FIG. 21 is a side elevational view of the operating rod of FIGS. 19–20, taken along line 21—21 of FIG. 19.

For a rotary type fifth wheel, the operating rod of FIGS. 19–21 may be used. The operating rod 102 includes operating leg 104 that comprises the follower and handle 108. A lower rod portion 410 extends the length of the rod 102, and an upper rod portion 412 is fixed to the lower rod portion by welding or some other suitable method. In the illustrated embodiment, the upper rod portion 412 is another length of rod of the same diameter and material as the lower rod 410, with a slight kink 414. In the illustrated embodiment, both rods are 0.50 inch diameter C-1040 steel. The illustrated upper rod portion 412 has a length of 9.31 inches, and the kink is 3 inches from one end. The kink 414 raises part of the upper rod portion 0.125 inches from the remainder of the surface, as shown at 415 in FIG. 21. The leg 104 of the operating rod is angled about 5° as shown at 416 in FIG. 19. As shown in FIG. 21, the illustrated operating handle 108 defines an angle 418 of about 98° with the central plane of the operating leg 104.

Figure 22:
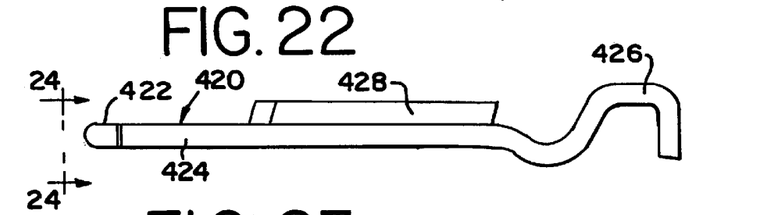
FIG. 22 is an enlarged side view of a straight pull type of operating rod for use with a fifth wheel.
Figure 23:
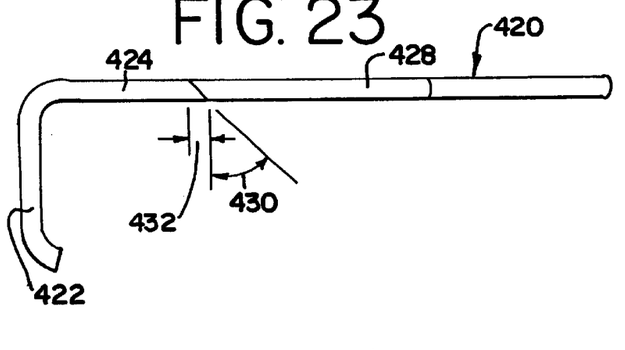
FIG. 23 is a top plan view of the operating rod of FIG. 22.
Figure 24:
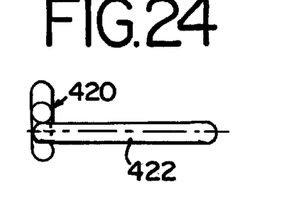
FIG. 24 is a side elevational view of the operating rod of FIGS. 22–23. taken along line 24—24 of FIG. 22.

The alternate operating rod 420 shown in FIGS. 22–24 is for use in a fifth wheel that does not utilize a guide path as shown at 140 in FIGS. 2–5. Instead, the operating rod of FIGS. 22–24 is pulled straight outward and raised to place the locking mechanism in the lockset position. In this operating rod 420, there is a handle 422, a lower rod 424, a hook end 426 for connection to the locking lever 90 of the fifth wheel, and an upper rod 428. Both the lower rod 424 and upper rod 428 are made of the same material, comprising 0.50 inch diameter C-1040 steel in the illustrated embodiment. The upper rod 428 has a length of about 6 inches, and is fixed to the lower rod 424 by welding or other suitable fixing method. At one end, the upper rod 428 is angled as shown at 430 at about 45° for a distance of about 0.5 inch shown at 432.

It should be understood that the two illustrated operating rods are provided by way of example only. The exact shape and dimensions of operating rods will depend on the type of fifth wheel plate, the shape and dimensions of the fifth wheel plate, the structure and operation of any indicator, and the particular mounting of the accessory uncoupling apparatus.

Whether used for rotary or straight pull types of fifth wheels, the accessory uncoupling apparatus of the present invention advantageously reduces the number of parts to simplify assembly, and preferably encloses the retracting mechanism so that the retracting mechanism is protected from damage. Moreover, instead of using an external guide mechanism, the present invention provides an internal guide mechanism so that wear and interference from contamination should be reduced. Assembly of the fifth wheel with the accessory uncoupling apparatus is also simplified. The weight of the accessory uncoupling apparatus and fifth wheel assembly are also advantageously reduced, compared to prior designs.

While only specific embodiments of the invention have been described and shown, it is apparent that various alterations and modifications can be made therein. It is therefore the intention in the appended claims to cover all such modifications and alternatives that may fall within the true scope of the invention.

We claim:

1. An accessory uncoupling apparatus for a fifth wheel plate for coupling a tractor and a trailer, said accessory uncoupling apparatus comprising:
    a cam having a central longitudinal axis; and
    a power device connected to move said cam from a retracted position to an extended position;
    a retracting mechanism biasing said cam toward the retracted position;
    wherein said cam, power device and retracting mechanism are substantially symmetric about the central longitudinal axis of said cam.

2. The apparatus of claim 1 wherein said cam includes a conical portion having a base and an outer diameter at the base.

3. The apparatus of claim 2 wherein said power device includes an actuating member with a central longitudinal axis, and wherein said conical portion of said cam has a central longitudinal axis that is substantially co-linear with the central longitudinal axis of the actuating member.

4. The apparatus of claim 2 wherein said cam further includes an annular shelf at the base of the conical portion, the outer diameter of the shelf being greater than the outer diameter of the base of the conical portion.

5. The apparatus of claim 4 wherein said cam includes a cylindrical portion between the conical portion and the power device, the cylindrical portion having a surface defining the annular shelf.

6. The apparatus of claim 1 wherein said power device includes a housing and an actuating member reciprocal in the housing, the actuating member having a longitudinal axis, the actuating member and cam being connected to be rotatable as a unit about the longitudinal axis of the actuating member, the housing further including a supply port for connection to a source of pressurized fluid.

7. An accessory uncoupling apparatus for a fifth wheel plate for coupling a tractor and a trailer, said accessory uncoupling apparatus comprising:
    a cam having a central longitudinal axis; and
    a power device connected to move said cam from a retracted position to an extended position;
    a retracting mechanism biasing said cam toward the retracted position;
    wherein said cam and power device are substantially symmetric about the central longitudinal axis of said cam; and
    wherein the power device includes a housing, a piston head and an actuating member connected to both the piston head and the cam, the piston head, retracting mechanism and part of the actuating member being within the housing, and wherein said cam is outside of the housing at least when in the extended position.

8. The apparatus of claim 7 wherein said retracting mechanism comprises a coil spring substantially concentric with the actuating member.

9. An accessory uncoupling apparatus for a fifth wheel plate for coupling a tractor and a trailer, said accessory uncoupling apparatus comprising
    a housing;
    an elongate actuating member having a portion in the housing and extending out of the housing, the actuating member being reciprocable within the housing;
    a piston head in the housing connected to the actuating member;
    a cam connected to the actuating member outside of the housing;
    a spring within the housing for retracting the actuating member.

10. The accessory uncoupling apparatus of claim 9 wherein the spring and actuating member are substantially concentric.

11. An accessory uncoupling apparatus for a fifth wheel for coupling a tractor and a trailer, the accessory uncoupling apparatus comprising:
    a housing;
    an elongate actuating member having a portion in the housing and extending out of the housing, the actuating member being reciprocable in the housing;
    a cam outside of the housing and connected to the actuating member;
    a piston head in the housing and connected to the actuating member for extending the actuating member and cam;
    a spring for retracting the actuating member and cam;
    wherein the load path for the load exerted by the spring to retract the actuating member is substantially the same as the load path exerted by the piston to extend the actuating member.

12. The accessory uncoupling apparatus of claim 11 further comprising a bushing in the housing through which the actuating member extends, and wherein the spring extends between the bushing and the piston head.

13. An accessory uncoupling apparatus for a fifth wheel for coupling a tractor and a trailer, said accessory uncoupling apparatus comprising:
    a cam; and
    a power device connected to move said cam from a retracted position to an extended position, said power device including a housing and an actuating member, said actuating member having a longitudinal axis and being reciprocal in said housing along said longitudinal axis, said actuating member being connected to said cam so that said cam and said actuating member are rotatable as a unit about the longitudinal axis of the actuating member, said housings including a supply port for connection to a source of pressurized fluid for movement of the cam from the retracted to the extended position.

14. The apparatus of claim 13 wherein said cam has a central longitudinal axis and wherein said cam and said power device are symmetric about the central longitudinal axis of said cam.

15. An accessory uncoupling apparatus for a fifth wheel for coupling a tractor and trailer, the fifth wheel including a movable cam follower, the accessory uncoupling apparatus comprising:

a cam including a guide surface for acting against the movable cam follower of the fifth wheel, the cam having a conical portion having a base, an outer diameter at the base, and a height, said cam further including a cylindrical portion defining an annular shelf at the base of the conical portion, the annular shelf having an outer diameter and the cylindrical portion having a height, the outer diameter of the shelf being greater than the outer diameter of the base of the conical portion and the height of the conical portion being at least as great as the height of the cylindrical portion, at least part of the conical portion of the cam and at least part of the annular shelf of the cam defining said cam guide surface; and a power device connected to move said cam from a retracted position to an extended position.

* * * * *